Figure 1:
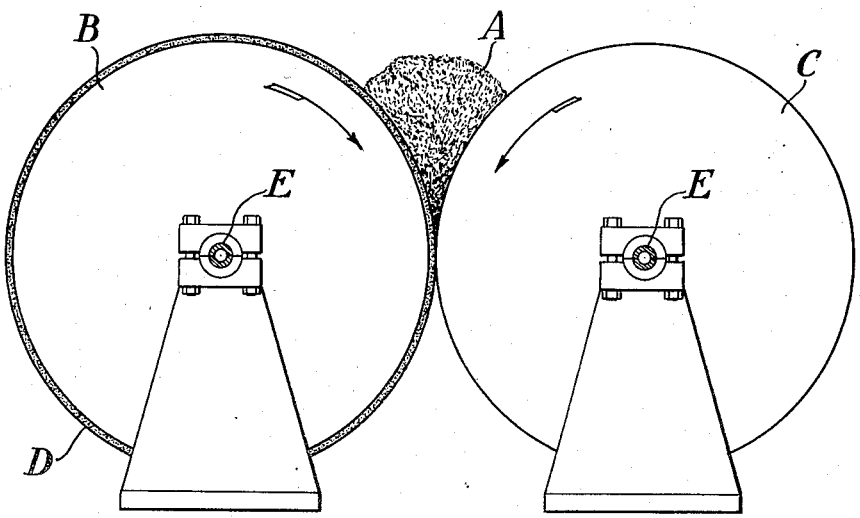

April 18, 1939.   F. R. CONKLIN   2,155,303

PROCESS FOR PREPARING PLASTICS

Filed July 18, 1936

Frederick R. Conklin INVENTOR.

BY

ATTORNEYS

Patented Apr. 18, 1939

2,155,303

UNITED STATES PATENT OFFICE 2,155,303

PROCESS FOR PREPARING PLASTICS

Frederick R. Conklin, Kingsport, Tenn., assignor, by mesne assignments, to Eastman Kodak Company, Jersey City, N. J., a corporation of New Jersey Application July 18, 1936, Serial No. 91,370

5 Claims. (Cl. 18—48)

This invention relates to the manufacture of plastic products and more particularly to the manufacture of colloidized or molded products, such as objects and sheets of various shapes and sizes, granules, powders and the like, from cellulose organic acid ester compositions, particularly those having a basis of cellulose acetate. This application is in part a continuation of my application Serial No. 665,258, filed April 10, 1933, entitled Molding process, now Patent No. 2,048,686 of July 28, 1936.

It is well known that many different compositions and many different processes can be employed in the production of cellulose ester plastics. One of the most widely employed methods is to flow a viscous solution of the cellulosic material in suitable solvents onto an appropriate surface and then cause the solvents to be evaporated, thereby casting the material into the desired form. Another method is simply to mix the cellulosic material in a relatively finely divided form together with a predetermined amount of solvent and/or plasticizer into a thick paste and extrude this through an opening of the desired shape.

In these and many other types of plastic processes a variety of cellulose derivatives have been employed, the best known and most widely used being cellulose nitrate and cellulose acetate, although various other inorganic and organic single and mixed esters, as well as ethers of cellulose have also been applied with more or less success. In the preparation of plastic compositions of this nature great emphasis has been placed, and rightly so, not only upon the type of cellulose compound itself, but especially upon the solvent and plasticizer employed. Much research work has been carried out and a great deal of literature published relating to these cellulose compounds, but notwithstanding this large accumulation of knowledge, especially with respect to the organic acid esters of cellulose typified by cellulose acetate, it is surprising that one of the most important facts concerning the use of this material in molding processes has previously been overlooked, namely, that the moisture content of the cellulosic material is of great importance in that it has an important influence upon such important properties of the finished product as density, toughness, resiliency, tensile strength, shrinkage, warping, stability and resistance to chemical decomposition. In working with cellulose ester plastics as described in my above identified application, I have discovered this quite inobvious and unexpected phenomenon, and, in fact, have discovered that the moisture content of the cellulosic material is a critical factor and that by keeping it below a certain maximum, a plastic product of greatly improved properties may be produced.

Althhough for convenience of discussion and illustration, I shall describe my present invention and its application with particular reference to cellulose acetate plastics, my process is equally applicable to the production of improved plastic products from any of the various cellulose organic acid esters such as cellulose propionate, cellulose butyrate, cellulose acetate propionate, cellulose acetate butyrate, and the like. The instant application is concerned, among other things, with one particular phase of the process described in the above identified application, namely, the working of moisture-containing cellulose organic acid ester-plasticizer mixtures upon rolls at temperatures above the boiling point of water, whereby a molding composition containing less than approximately .5% moisture is obtained.

The present invention has for an object a further improvement over the technique, described in my above mentioned application, for the manufacture of cellulose organic acid ester plastic products which have markedly improved density, tensile strength, toughness, resistance to chemical action, improved stability, and other desirable properties.

Another object of the invention is an improved process wherein a cellulose organic acid ester plastic may be produced which has a minimum moisture content, without the need of a separate drying operation, irrespective of its initial moisture content. Other objects will hereinafter appear.

Cellulose ester plastic processes may, for convenience of illustration, be divided into two principal classes. The first of these includes processes wherein the plastic material is worked up into a plastic mass with the aid of solvents of a more or less volatile character. In such processes plasticizing substances, dyes, pigments or other coloring material are usually also added. Under this class may be included, for convenience, the method of plasticizing cellulose ester which comprises making a solution of the plasticizer in a liquid, such as benzol, which dissolves the plasticizer but which is a non-solvent for the cellulose ester, and then treating (as by soaking and/or refluxing) the cellulose ester with such non-solvent solution so that the plasticizer thoroughly permeates the cellulose ester and then driving off the non-solvent, leaving the plasticizer behind thoroughly permeating the cellulose ester particles.

The second class includes those processes in which substantially no volatile solvents are employed, the cellulose ester material merely being worked up with the plasticizer and other ingredients which it may be desired to incorporate. The second type of process has the very great advantage that the resulting products have no volatile materials included in their structure which have to be removed, as is the case with products produced according to the first mentioned class, by extensive curing operations. It is with the second class of processes that the present application is concerned, and most properly so for the reason that molded products produced from this type of plastic seem to have had no considerable commercial success in this country until my discovery of the critical element—low moisture content—which makes such plastics possible of useful commercial application.

In working with many different types of plastics in which a wide variety of cellulose ester molding compositions were molded, I have found that molded products produced from molding compositions containing several percent of moisture, such as a composition produced by mere cold or warm mixing with a plasticizer (and optionally solvents) of a cellulose ester which has several percent of moisture, were subject to severe shrinkage and warping upon being removed from the mold. During molding it was also found that considerable quantities of gas or vapor were evolved from moist materials, forming a spongy product of low density, tensile strength and toughness. Extensive experiments were carried out to discover the cause of these defects, and it was found that they were due to the presence in the original cellulose ester molding composition of an appreciable amount of moisture. I found that if the moisture in the molding composition at the time it was molded was kept below approximately .5%, a beautiful, lustrous product of exceptionally high density, high tensile strength and low shrinkage and warp was produced.

In accordance with the present invention, I am able to produce a cellulose ester plastic having a low moisture content from which a plastic article, having the desirable characteristics heretofore enumerated, can be made without the necessity of the preliminary drying operation described in my above mentioned application. This is achieved by hot rolling (colloidizing) the finely divided cellulose organic acid ester particles which are mixed with a suitable plasticizer and, if desired, suitable fillers, on rolls which are maintained at a temperature above that of the boiling point of water, and more particularly within a range of from approximately 212° F. to 370° F., although higher temperatures may be employed so long as the temperature is not such as will decompose the particular cellulose organic ester being processed; temperatures of 250°–350° F. work well with most lower aliphatic acid esters of cellulose. I have found that this hot rolling treatment will reduce the moisture content of the plastic material, irrespective of its initial moisture content, to approximately .5% or below, depending somewhat on the length of time and the temperature at which the rolling is carried on. For cellulose organic acid ester plastics containing a normal moisture content of— say—1–6%, hot rolling for 10 to 15 minutes reduces the moisture content of the molding composition below the point where molded products having undesirable characteristics are produced therefrom.

Figure 2:
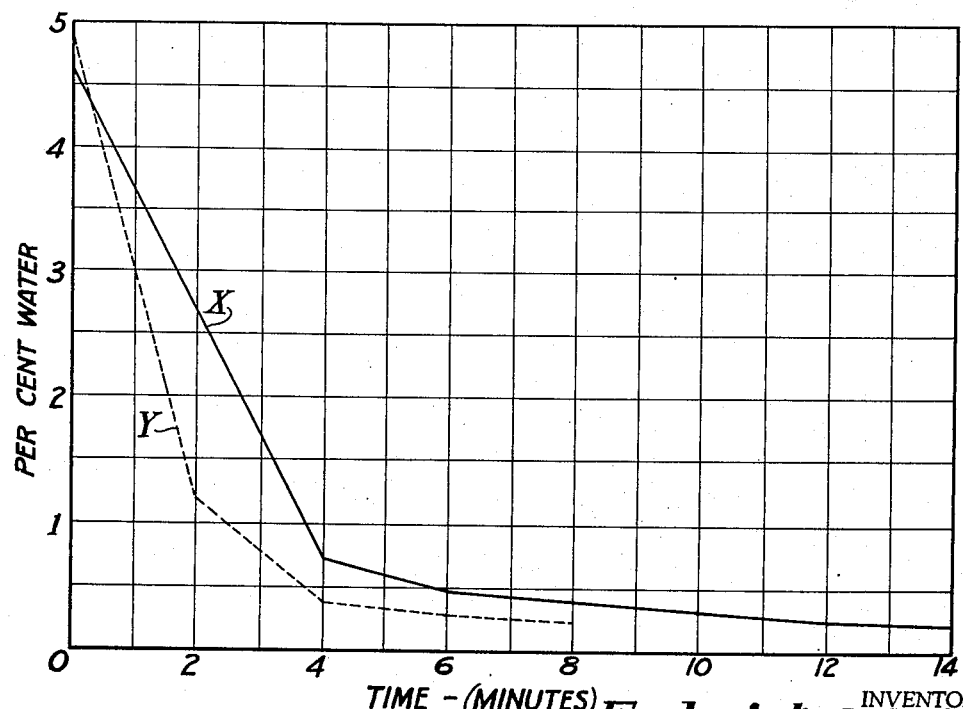

The invention will be more clearly understood by reference to the drawing in which;

Fig. 1 is a view of the colloidizing rollers in the operation of kneading a plastic mass, Fig. 2 is a graphical representation of the reduction of moisture in a plastic mass as a result of the hot rolling treatment.

The actual molding composition is prepared by mixing together in a suitable mixer at atmospheric temperature an appropriate amount of the cellulose ester material, plasticizer, and any other addition such as dyes, pigments, pearl essence, fillers and the like which may be desired, the use of any substantial amount of organic volatile materials being avoided. The mass is then subjected to kneading on heated rolls as shown in Fig. 1 of the attached drawing in which the mass A is kneaded between the heated and driven hollow rolls or drums B and C until entirely homogeneous. Both rolls may be driven, or only roll B. Heat is supplied to the rolls by means of steam, water or oil, as well known with such apparatus. I have found, for instance, the heat from about 1# to 160# steam (212° F. to 370° F.) works well. One of the rolls may be maintained at a higher temperature than the other in order that the plastic mass will gradually accumulate on the hotter roll and thereby facilitate removing the completely colloidized plastic from the rolling apparatus. It has been found that this result will be satisfactorily attained, if one roll is heated with 40# of steam (267° F.) and the other with 60# of steam (292° F.). The heating fluid is introduced through pipes E suitably journaled or packed in the end of the drums B and C, which drums are mounted on the usual bearings. One of the drums (preferably the idler drum, if only one is driven) is on an adjustable axis so that the gap through which the material must pass, may be varied to correspondingly vary the pressure applied to the material during the kneading operation. I have found that with the drums rotating only a few R. P. M. that a 15 to 20 pound batch of plastic may be thoroughly kneaded and converted to a completely homogeneous mass in about five minutes and that after 10 to 15 minutes the moisture content of the material will usually be .5% or below as a result of this treatment.

My process is applicable to cellulose organic acid esters having any percentage of moisture met with in ordinary commercial practice, such as esters containing from .5% to 15% of moisture, or even higher moisture contents, although greater than 10% moisture content is normally not met with in commercial practice. Obviously, it does not matter whether the moisture is present in the cellulose ester or whether some of the above percentages is accounted for by water in the plasticizer, filler or the like, my process substantially eliminates that moisture content from the final molding composition.

The graphs depicted in Fig. 2 are typical curves showing how the moisture content in two different batches of plasticized cellulose is rapidly reduced by my hot colloidization process to less than .5% in a few minutes and then further lowered by continued hot rolling. The curve designated as X shows that a batch containing 4.6% moisture was added to the rolls over a period of 4 minutes, during which the moisture content was reduced to approximately 0.72% and then was further reduced to less than .5% in about 6 minutes. Curve Y shows the moisture reduction of a similar batch of material which was added to the rolls over a period of 2 minutes during which the moisture was reduced to 1.22% and after 4 minutes to less than .5%; continued rolling reduced the moisture content to a further extent.

The kneading may be facilitated by occasionally pulling portions of the sheet D from the roll and throwing or twisting it over upon itself. I have found that if the plastic composition contains filling material this rolling process will, by virtue of the shearing force, set up between the rolls in the doughy or rubbery plastic, break down the agglomerated particles and uniformly disperse them in the composition. Striated, streamed or cascaded effects, particularly with pearl essence, may be obtained by working the mass on the rolls to substantial homogeneity and then dropping here and there upon the rolls (where they converge) cubes or granules of previously prepared cellulose ester-pearl essence plastic in which the pearl essence is of relatively high concentration, as described in my copending application Serial No. 726,311 filed May 18, 1934. These cubes or granules are preferably of the same cellulose ester as already upon the rolls. As the mass is further worked, the concentrated pearl essence is distributed in a beautiful heterogeneous pattern throughout the sheet D.

The hot plasticized sheet D is then stripped from the roll B and directly worked up into the desired form, shortly after it leaves the kneading rolls, such as by pressing it in a hot platen press or in a mold, or it may be cut up into strips for molding desired shapes, or it may be cooled and broken up or granulated into small particles which in turn may be remolded in much the same manner as molding powders are molded. The granular material thus produced is a particularly valuable form of molding composition. Each of its granules is a sealed agglomerate of smaller colloidized particles homogeneously welded together into a unit. As the moisture has already been reduced to a substantially negligible minimum, and the plasticizer and cellulose ester are thoroughly colloidized by the combined action of heat and pressure on the calender rolls,, there results a colloidized material substantially sealed against the inter-penetration or absorption of moisture. It will be seen that the material is thus protected against deterioration and, since sufficient moisture does not collect on the surface of the granule under normal humidity to adversely affect its use in molding, these moisture-free granules are accordingly always ready for immediate use and, on recolloidizing in a suitable mold by heat and pressure, actually give a stronger product than results from molding the acetate powder-plasticizer mixture directly after a single colloidization. However, to reduce or eliminate this surface moisture the freshly colloidized granular material may be immediately transferred to drums which are substantially moistureproof and from which it may be molded without further drying even after a reasonably long time.

Attention is again called to the fact that the herein-described process for the production of the plasticized cellulose ester molding composition is characterized by comparative simplicity and that the material contains no low boiling solvents and a negligible quantity of moisture. It will thus be seen that the resulting product need not be cured or subjected to any other treatment before being used for the purpose for which it is ultimately intended.

With respect to plasticizing material, I have found that a wide variety of such agents may be employed. However, I have also found that tripropionin gives the most satisfactory results, especially with dry cellulose acetate. The amount of this plasticizer which is employed may vary widely, depending upon the degree of plasticity desired, as well as upon the working conditions of the process. I have found, for example, that from about 28 to 65 parts, or even more, of tripropionin per 100 parts of cellulose acetate is satisfactory. It may be said that this plasticizer is distinctive in several respects. For example, it has no appreciable rapid solvent action upon the cellulose ester in the cold and can, therefore, be readily mixed with the finely divided ester material without balling up, yet upon application of heat it readily colloidizes the material. This makes possible thorough incorporation of the plasticizer prior to the application of heat to the mass on the rolls. Tripropionin appears to have an almost unlimited plasticizing action on cellulose esters under heat and pressure. I have found it is not ordinarily necessary to change the plasticizing roll temperature with a change in the placticizer content, as is the case with plasticizers, such as dimethyl phthalate, which have a higher solvent action on cellulose acetate.

While tripropionin is outstanding in its valuable properties, other plasticizers for cellulose acetate may be employed in my process. Among these may be mentioned dimethyl phthalate, penta-erythritol-tetracetate, triphenyl phosphate, tricresyl phosphate, monochlor-naphthalene, triacetin, monoacetin. In addition to the placticizers just mentioned, it has been found that diaceto-glyceryl propionate, dipropionyl glyceryl acetate and dipropionin are good plasticizing materials for cellulose acetate. Their general plasticizing action for cellulose organic esters is more particularly referred to in the copending application of David D. Hull, Serial No. 665,335, filed April 10, 1933 now Patent No. 2,029,925 of February 4, 1936, and forms no part of the present invention, except that I have discovered that when cellulose acetate molding compositions are plasticized with propionyl-containing fatty acid esters of glycerine, highly satisfactory results may be obtained. In general, it may be said that the particular placticizer employed with any given cellulose organic ester material will depend largely upon the particular cellulose ester dealt with, although I have found the foregoing propionic esters of especial value as plasticizers with cellulose organic esters.

The advantages of employing my low moisture molding composition are present with both of the principal types of molding processes, namely, open molding and injection molding. For open molding one may employ either blanks of thick sheeting of the proper size or one may employ granules. For injection molding, it is best to employ granules of the composition, which are heated in the extrusion cylinder and extruded through a narrow orifice into a closed cooled mold.

If instead of employing cellulose acetate as the cellulose ester base material, cellulose acetate-propionate or butyrate is used, the resulting molding compositions may be molded at somewhat lower temperatures. In the case of both open molding or injection molding this is advantageous because less heat is required to obtain easy flow of the molding composition into the mold.

Additional ease of flow may be obtained, in the case of all of the various organic acid esters of cellulose, by employing low viscosity esters—the lower the viscosity the less heat required for a given flow to be obtained.

While I have stated above that the temperature of colloidization on the rolls should exceed 212° F. it will be understood that this does not require that both rolls shall be maintained at a temperature above 212° F. For instance, one roll may be maintained at 225° F. and the other at 200° F. or even less. Since the hot roll is maintained above 212° F. it will drive out the moisture from the mixture due to the fact that during the rolling operation, all parts of the mixture will come under the influence of the moisture eliminating temperature of the hot roll.

The following example will serve to illustrate a typical molding composition which may be produced according to the present invention.

Example 1

Cellulose acetate produced in accordance with any of the known methods of making this material is ground in a conventional type of ball mill, preferably employing one inch balls. The ground material is then screened through an 80 mesh screen.

The finely divided material is mixed with the plasticizer in the following manner: 100 parts by weight of cellulose acetate is mixed with 28 parts by weight of tripropionin in a proper receptacle at atmospheric temperature. The mixture is then transferred to kneading rolls when it is worked up and the mixture thoroughly colloidized at a temperature of above 212° F., such as 250°–300° F. After thorough working up on the heated kneading rolls during which, in accordance with the invention, the moisture content is reduced to approximately .5% or less, the plastic mass may be passed to calender rolls for further calendering into thin sheets, or it may be directly transferred into molds or onto platen presses for putting it into the desired form; or the product may be crushed or granulated to any desired size such as 1/4 to 1/64 inch approximate diameter and used for molding objects in accordance with the usual open or injection molding processes.

A product so produced will not shrink or warp upon cooling and standing and is unusually tough and strong. It is also a product of unusual density, an average of samples ranging in density from about 1.25 to about 1.56. With a higher proportion of plasticizer, the density of the product will vary slightly, decreasing with increased proportions of plasticizer.

If a colored product is desired, dyes, pigments, irridescent materials, such as pearl essence, bronze powder and the like, may be incorporated into the material at any desired point in the process. Dyes, for example, may be incorporated by simply working them into the plastic mass on the kneading rolls or by adding them to the mixture of cellulose ester and plasticizer before it is placed on the rolls. One particularly satisfactory method is to dissolve the dye in the plasticizer (of course, selecting a dye which is soluble in the plasticizer employed) and then incorporating the dyed plasticizer into the ester. This latter method is the subject of U. S. Patent No. 1,966,327 to R. O. Wood. Normally only a fraction of a percent. of dye is necessary to effect adequate coloration of the molding composition; larger percentages can, however, be employed if desired. The amount of pigment employed, varies depending upon the use to which the composition is to be put, varying from a fraction of a percent. to as much as 50% or even more of the molding composition. The advantage of my process is that regardless of the percent of dye or pigment employed, and regardless of its moisture content, a uniformly low moisture molding composition is obtained.

It will be seen from the above description that my plastic product is characterized by the substantially complete absence of volatile solvents and the substantially complete absence of moisture. It, therefore, requires no further treatment, such as a curing operation, for removal of volatile constituents. More important, however, it is free from inclusion of moisture undesirably affecting the strength, density and other qualities as is inherently the case with prior art products produced in accordance with known methods and in which no effort has been made to reduce the moisture to a minimum as in the present invention.

As before alluded to, I have found that there is a rather definite relation between moisture and such properties as shrinkage, warping, tensile strength, toughness, density and the like. Shrinkage and warping increase, while toughness, tensile strength and density decrease sharply when the moisture content increases substantially above .5%. In fact a variety of curves might be plotted, illustrating the fact that these properties are functions of the moisture content. The reduction of moisture also eliminates blistering and pocket formations in the mold, due to condensations of the moisture. It is believed that the smudging often present in molded plasticized articles is caused by the formation of an azeotropic mixture between the water and the plasticizer. This detrimental occurrence is prevented when the moisture content is below .5%.

While I have illustrated my invention by reference to cellulose acetate plastics, it is evident that it can be applied to processes in which various other cellulose organic esters, such as cellulose acetate-propionate, cellulose acetate-stearate, cellulose butyrate and other single and mixed esters of cellulose are employed. As previously indicated an appropriate plasticizer will be employed, the particular plasticizer employed being largely a matter of selection and within the knowledge of the person skilled in the art. In general the operating conditions will be essentially the same with any of the higher cellulose esters and satisfactory products may be produced therefrom, providing, however, that the moisture content of cellulosic material is brought down by the hot rolling treatment to the desired degree. The material produced as above described is characterized by extreme toughness and resilience, this property rendering it especially adaptable for the manufacture of thin-walled articles. Photomicrographs of the material show that it is of an extremely dense and compact internal structure, free from gas pockets, bubbles or sponginess, which are common to molded products produced according to known methods. It is thermoplastic, changing its physical form under heat and pressure without undergoing any chemical change. It has a beautiful lustrous finish and can be produced in any desired color.

as indicated above, by the addition of pigments, dyes or other types of coloring material.

It will be evident from the above description that the present invention is a considerable improvement over the process claimed in my former application, in that it not only eliminates a complicated and expensive drying procedure, but also reduces the time required for processing from a period varying from hours up to to days down to a comparatively few minutes. Moreover, this is all accomplished without additional processing machinery. It furthermore permits, if desired, the employment of a substantially continuous process from the manufacture of the cellulose acetate or other such material to the final molding operation without a delay for drying purposes and without any impairment in the quality of the finished product, due to the presence of moisture.

What I claim is:

1. The process of making a cellulose organic acid ester molding composition which comprises mixing at atmospheric temperature a quantity of a plasticizer with a quantity of a cellulose organic acid ester containing more than approximately .5% moisture, the acid radicals of which ester contain from two to four carbon atoms, in the absence of any substantial quantity of volatile solvents, colloidizing the mixture by transferring it to and working it between rolls, at least one of which is maintained at a temperature above 212° F. but below the decomposition temperature of the cellulose ester, and continuing said rolling operation until the moisture content of the molding composition is below approximately .5%.

2. The process of making a cellulose acetate molding composition which comprises mixing at atmospheric temperature a quantity of a plasticizer with a quantity of a cellulose acetate containing more than approximately .5% moisture, in the absence of any substantial quantity of volatile solvents, colloidizing the mixture by transferring it to and working it between rolls, at least one of which is maintained at a temperature above 212° F. but below the decomposition temperature of the cellulose ester, and continuing said rolling operation until the moisture content of the molding composition is below approximately .5%.

3. The process of making a cellulose organic acid ester molding composition which comprises mixing at atmospheric temperature a quantity of a propionyl-containing ester of glycerine with a quantity of cellulose organic acid ester containing more than approximately .5% moisture, the acid radicals of which ester contain from two to four carbon atoms, in the absence of any substantial quantity of volatile solvents, colloidizing the mixture by transferring it to and working it between rolls, at least one of which is maintained at a temperature above 212° F. but below the decomposition temperature of the cellulose ester, and continuing said rolling operation until the moisture content of the molding composition is below approximately .5%.

4. The process of making a cellulose acetate molding composition which comprises mixing at atmospheric temperature a quantity of a plasticizer with a quantity of a cellulose acetate containing more than approximately .5% moisture, in the absence of any substantial quantity of volatile solvents, colloidzing the mixture by transferring it to and working it between rolls, at least one of which is maintained at a temperature between 212° F. and 370° F., and continuing said rolling operation until the moisture content of the molding composition is below approximately .5%.

5. The process of making an organic thermoplastic molding composition which comprises mixing at atmospheric temperature a quantity of a plasticizer with a quantity of an organic thermoplastic containing more than approximately .5% moisture, in the absence of any substantial quantity of volatile solvents, colloidizing the mixture by transferring it to and working it between rolls, at least one of which is maintained at a temperature above 212° F. but below the decomposition temperature of the composition, and continuing said rolling operation until the moisture content of the molding composition is below approximately .5%.

6. The method of forming a molded product with a surface composed of light-reflecting areas separated by darker zones which comprises supplying to a mold particles of subdivided molding material in sizes at least as large as grains of sand (a thin molded layer of which molding material is transparent or translucent) which molding material has small light-reflecting particles distributed throughout it, and subjecting the molding material to heat and pressure in the mold to cause it to flow therein and fill the mold and thus form a molded product with a surface composed of light reflecting areas separated by darker zones.

7. A molded product which comprises small light-reflecting particles distributed throughout a molding material (a thin molded layer of which is transparent or translucent) and at the surface of said molded product light-reflecting areas separated by darker lines or areas, the small light-reflecting particles in the light-reflecting areas being so oriented as to cause markedly greater light-reflection therefrom than from the darker lines or areas.

8. The process of claim 6 in which the molding material is a cellulose derivative.

9. The process of claim 6 in which the molding material is cellulose acetate.

10. The product of claim 7 in which the molding material is a cellulose derivative.

11. The product of claim 7 in which the molding material is cellulose acetate.

12. The method of forming molded products which comprises distributing a powder of light-reflecting particles throughout a mass of a molding material (a thin molded layer of which is transparent or translucent) and dyeing said molding material with a soluble dyestuff, subdividing the resulting product into particles at least the size of grains of sand, filling resulting particles into a mold and molding it therein with heat under pressure.

13. A dyed molded product which comprises small light-reflecting particles distributed throughout a molding material (a thin molded layer of which is transparent or translucent), and on the surface of said molded product light-reflecting areas separated by darker zones, the small light-reflecting particles in the light-reflecting areas being so oriented as to cause markedly greater light-reflection therefrom than from the darker lines or areas.

14. The method of forming a molded product a surface of which is composed of light-reflecting areas separated by darker zones which comprises pressing against a surface in a mold, a subdivided mass of molding material (a thin molded layer of which is transparent or translucent), which mass comprises particles at least the size of grains of sand throughout which small light-reflecting particles are substantially evenly distributed.

15. A product with a molded surface composed of light-reflecting areas separated by darker zones which surface is composed of a molding material (a thin molded layer of which is transparent or translucent) in which are small light-reflecting particles which are so oriented in the light-reflecting areas as to cause markedly greater light reflection from these areas than from the darker zones.

FREDERICK R. CONKLIN.